United States Patent Office 3,068,118
Patented Dec. 11, 1962

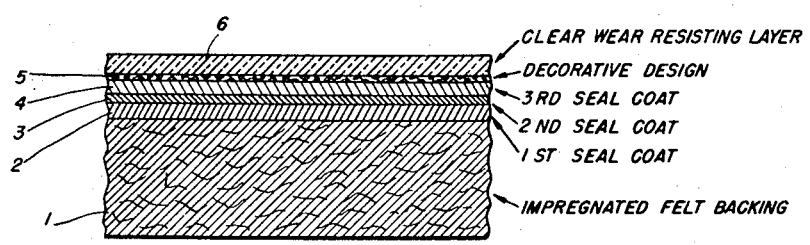
INVENTORS.
JOHN BISKUP
SPENCER JOHNSON
PAUL C. WETTERAU
ATTORNEY

3,068,118
DECORATIVE SURFACE COVERING
John Biskup, Chatham, Spencer Johnson, Pompton Plains, and Paul C. Wetterau, Mountain Lakes, N.J., assignors to Congoleum-Nairn Inc., Kearny, N.J., a corporation of New York
Filed Jan. 12, 1962, Ser. No. 177,686
40 Claims. (Cl. 117—76)

This invention relates to surface coverings and, in particular, to decorative surface coverings having a fibrous base and a wear-resistant top layer for use on floors, walls and the like.

This application is a continuation-in-part of our pending U.S. application Ser. No. 750,124, filed July 22, 1958, which in turn is a continuation-in-part of our U.S. application Ser. No. 586,023, filed May 21, 1956, both now abandoned.

Decorative surface coverings having a fibrous base are well-known in the art. It has been conventional practice to impregnate a fibrous sheet, such as felt, with a bituminous material and to apply to the surface of the impregnated felt an oleoresinous seal coat to act as a barrier to prevent the bituminous impregnant from staining the subsequently applied decorative layer. This decorative layer has, in the past, been most commonly an enamel which is applied using a flat bed printing machine. In this type of product, the decorative coating also provides the wear-resistant layer. Alternately, the decoration can be applied to the seal coated felt with a printing ink using one of the rotary graphic art printing processes, such as rotogravure, offset printing, lithography and the like. This thin ink layer is then protected by a subsequently applied clear wear layer. This clear wear layer comprises an oleoresinous varnish, an alkyd resin, a urea-melamine, alkyd resin or similar material.

Although such products are inexpensive to produce, their life is comparatively short. There has been considerable interest in improving the quality of such products by providing as a clear top or wear layer a resinous material of greater hardness and wear resistance than the conventional resins and varnishes which have been used in the past. A typical example of such an improved material is a vinyl resin. Vinyl resins have known properties of abrasion resistance and resistance to chemicals which make them especially valuable and useful in providing the wear resistant and/or decorative layer for a felt base floor covering.

When an attempt is made to apply a vinyl composition wearing surface layer over a conventional printed felt base product, two serious difficulties become evident. The first difficulty is the migration of bituminous impregnant from the felt sheet. When a vinyl composition is applied to a sheet in the form of an organosol, a plastisol or a hydrosol, the coating must be subjected to high temperatures frequently on the order of 350° F. to 375° F. in order to fuse the vinyl resin. The process of fusion whereby the resin becomes solvated by the plasticizer present in the vinyl composition is essential to produce a vinyl wearing surface layer with optimum strength and resistance to abrasion. At these elevated temperatures, the bituminous impregnant not only has a strong tendency to bleed out of the back of the sheet forming spots of the impregnant on the back, but even more serious with conventional oleoresinous seal coating paints, the bituminous impregnant tends to migrate into the upper surface of the sheet. This results in blistering of the decorative layer and a yellow discoloration of the printed design rendering a product of little commercial value. The second difficulty is the fact that a vinyl composition has only limited adhesion to conventional oleoresinous printing paints with the result that the vinyl wearing surface layer can be readily stripped from the surface of the product, which obviously results in a product of little commercial value. Even where the bituminous impregnant in the felt sheet is replaced by a resinous impregnant which does not show any tendency towards bleeding and migration at elevated temperatures, the poor adhesion of the vinyl composition wearing surface layer to conventional oleoresinous compositions still results in an unacceptable product.

One method which has been developed to overcome the difficulties due to poor adhesion and also due to blistering and bleeding of a bituminous impregnant at high temperatures has involved the application of a decorative design and a vinyl composition wearing surface layer to a resin impregnated sheet of paper which is then laminated to the bitumen impregnated felt with a suitable adhesive. The resin impregnated paper is costly and satisfactory lamination of the printed paper to the impregnated felt is difficult. The bond between the paper and the felt represents an area of potential weakness and the product is susceptible to delamination at this point. In addition, the surface of even the most carefully prepared sheet such as is conventionally used as a backing for printed surface coverings is not perfectly smooth. As a result of this when the resinous impregnated paper is laminated to the felt, the thin paper sheet tends to conform to any irregularities in the felt. The finished product produced by this technique, therefore, does not have an absolutely smooth surface. Since a vinyl composition wearing surface layer is characterized by having high gloss, any lack of smoothness in the product is readily apparent when the product has been installed as a floor covering.

It is an object of the invention to provide a printed surface covering having an impregnated fibrous base and a fused vinyl wearing surface layer which has a smooth surface and which is characterized by a high degree of resistance to delamination. It is another object of the invention to provide a printed surface covering having a bitumen impregnated fibrous base and a fused vinyl wearing surface layer wherein the exposed surface of the product is not marred by discoloration due to migration of the bituminous impregnant. Other objects and advantages of the invention will appear hereinafter.

In accordance with the invention, a system of vinyl resin containing seal coats has been found whereby a fused vinyl wearing surface layer can be made firmly adherent to an impregnated fibrous sheet.

The drawing illustrates a preferred embodiment of the invention and shows a cross-sectional view of a printed surface covering produced in accordance with the invention. An impregnated felt sheet 1 is provided with a first seal coat 2 and applied thereto are second and third seal coats 3 and 4. A decorative design 5 is applied to the third seal coat and a clear wear resistant layer 6 is applied over the decorative coat.

The fibrous base for use in the invention is preferably a web of felted fibers. The felt generally is produced using a Fourdrinier or cylinder paper machine with the thickness of the resulting sheet being that usually used in floor and wall coverings, that is, from 0.02 to 0.08 inch. A thickness of about 0.047 inch is usually preferred. The fibrous material used is normally cellulosic in origin, although other fibers can be used including those of mineral and animal origin, such as asbestos or wool. The sources of cellulosic material can include cotton or other rag material, wood pulp including both ground wood and chemical wood pulp, paper, boxes, or mixtures thereof in any proportion. The web can also contain fillers such as wood flour.

The felt is normally strengthened and improved in water resistance by impregnation with a water-resistant resinous material. Bituminous materials are well-known as impregnants in the production of printed surface coverings and include asphalts of petroleum or natural origin and tars and pitch residues of animal or vegetable origin. These materials can be treated to attain the desired physical properties of softening point or viscosity for satisfactory impregnation by such treatment as air blowing, steam distillation and the like.

The bituminous material is conventionally incorporated into the felt by hot melt impregantion technique. A bath of molten bituminous material such as asphalt is maintained at a high temperature at which the material is in a liquid state. With the asphalts which are commonly used as impregnants in the production of impregnated felt (a typical asphalt having a melting point between 140 and 150° F.), a bath temperature in the neighborhood of 400° F. to 450° F. is normally used. Alternately, the bituminous material can be dissolved in a suitable solvent and the resulting solution used to impregnate the felt sheet. This method is generally not as desirable since the impregnated sheet must be dried to remove the solvent. Alternately, the bituminous material can be incorporated with the fibers during manufacture of the felted fibrous sheet. In this technique, a bituminous emulsion can be added to the water dispersion of fibers in the beater prior to the sheet forming step. In the beater addition technique, the bituminous material is precipitated onto the surface of the fibers.

It has been found that a bitumen impregnated felt which provided with seal coats can successfully withstand fusion temperatures as high as 400° F. without blistering or bleeding if the quantity of bituminous impregnant is controlled so as not to exceed a definite critical amount. It has been found that this critical amount is related to the absorption characteristics of the particular felt used. The absorption characteristics of felt can be determined with respect to a standard liquid medium such as kerosene. The amount of kerosene which can be absorbed in a fibrous sheet expressed as the percent kerosene by weight based on the weight of dry fibers is defined as the kerosene value of the felt. The higher the kerosene value of a particular felt, the greater the ability of the felt to absorb a liquid. The absorption characteristics of felt are influenced principally by the physical characteristics of the individual fibers used to form the sheet. This is determined not only by the particular source of the fibers such as rags or wood pulp, but also the degree of refining of the fibers prior to the sheet forming step. In the manufacture of paper and felt, the fibers are subjected to mechanical action in beaters, Jordan machines and the like. It has been found that, depending on the particular type of fibers used and the degree of refining prior to sheet formation, the kerosene value of the resulting sheet can vary over rather wide limits even with a constant furnish. The kerosene value of fibrous sheets used as backings for printed surface coverings can vary from 120 percent to as high as 200 percent. In view of this wide variation in the kerosene value and thus the absorption characteristics of a felt sheet, the critical quantity of bituminous impregnant incorporated in the felt in accordance with the invention is best defined as a percentage of the kerosene value of the felt.

The kerosene value is related to the maximum amount of kerosene that can be absorbed by a bone dry sample of a particular felt according to the test as prescribed in "Underwriters Laboratories, Inc., Standard for Class "C" Asphalt Organic Felt Sheet Roofing and Shingles," tenth edition, September 1953.

In accordance with this test, a sample of felt is dried for at least one hour in an oven maintained at 200° F. The dried sample is cooled in a desiccator and weighed. It is suspended by a hook through one corner in 1 liter of kerosene maintained at 77° F. Vacuum (not less than 28 inches of mercury) is applied for at least 15 minutes or until bubbles cease to come from the sample. The sample is removed from the kerosene and allowed to drain for 3 minutes plus or minus 1 second with the lower corner touching the edge of the testing vessel. The saturated sample is then weighed and the kerosene value of the felt is determined as the weight of kerosene absorbed, expressed as a percentage of the weight of the dry felt.

It has been found that the maximum amount of bituminous impregnant in a felt sheet should not exceed 60 percent of the kerosene value of the felt in the production of backing sheets in accordance with the invention. Where this quantity is exceeded the subjecting of the impregnated felt to the elevated temperatures required for fusing a vinyl chloride wear layer results in blistering and bleeding.

It is essential that the bituminous impregnant be uniformly dispersed throughout the felt sheet. This can be controlled to some extent by the saturating technique through use of pressure rolls in the saturating bath. Where the bituminous impregnant is not uniformly dispersed throughout the felt blistering can frequently occur due to high concentrations of bituminous material adjacent to one surface of the felt. Although careful control of the impregnation process can greatly aid in attaining uniform impregnation, it has been found that the disposition of impregnant can be still further improved by subjecting the impregnated felt to a heat treatment step. The length of the heat treatment depends upon the temperature employed. Thus, heat treatment for 2 to about 5 minutes at 350° F. or at 195° F. for from about 2 hours to as long as 4 days can be used.

The amount of bituminous impregnant should preferably be as close to the critical maximum as can be attained in normal manufacturing operations. This is necessary in order that the impregnated fibrous sheet have the optimum possible strength and water resistance. The amount of bituminous impregnant should be at least 35 percent of the kerosene value of the fibrous sheet in order to obtain a satisfactory product.

Other impregnants for the fibrous sheet can also be used to form backing sheets for use in the production of printed surface coverings in accordance with the invention. Such materials as phenol-formaldehyde and phenol-urea resins, polymerized vinyl compounds, such as polyvinyl chloride, polyvinyl acetate and the like, cellulose acetate, cellulose nitrate, butadiene-styrene copolymer, butadiene acrylonitrile copolymer, natural rubber and the like can be used. Polymerizable materials can also be incorporated into the felt and the sheet subjected to heat to cure and polymerize the material. Such materials as natural and synthetic drying oils, mixtures of polyhydric alcohols and polybasic acids which cure to form polyesters, mixtures of polyhydric alcohols and polyisocyanates which cure to form urethane polymers, and the like can be used. In general, asphalt is the preferred impregnant due to its extremely low cost.

In the production of printed surface coverings utilizing impregnated backing sheets in accordance with the invention, the backing is provided with two or more seal coats prior to the application of the decorative design. The seal coats perform the desirable function of masking the dark color of the bituminous impregnant and in addition create a smooth uniform surface suitable as a base for printing. Felt sheets of the type commonly used as backings for printed surface coverings tend to have minor surface irregularities due to non-uniformities in the felt-making equipment. The sheet also frequently shows a number of small protruding lengths of fibers. The seal coats are designed to hide all these irregularities. The total thickness of seal coats required is normally at least 0.004 inch and preferably from about 0.004 to about 0.012 inch. This thickness can be created through use of two thick coats or several superimposed thinner coatings. Using the conventional techniques of coating such as flexible doctor roller application, the desired thickness is created by use of at least two coats. The use of multiple coats is also desirable in promoting optimum adhesion of the wearing surface layer to the backing, since the seal coat applied directly to the fibrous backing can be designed for optimum sealing against migration of bituminous impregnant and the uppermost seal coat can be designed for optimum adhesion to the polyvinyl chloride wearing surface layer.

The seal coats are preferably applied in the form of an aqueous emulsion of resinous binder and filler. In the preparation of the seal coats, the resinous binder and filler are emulsified in water in the presence of conventional wetting agents, thickening agents, anti-foam agents, sequestering agents and the like. After the application of each seal coat to the fibrous backing sheet, the coating is dried by subjecting the sheet to heat, as for example in the range of about 100° F. to about 150° F. for about 30 minutes to about 2 hours. Alternately, drying can be effected by exposing the coated sheet after the application of each seal coat to a temperature of 350° F. to 400° F. for 1 to 5 minutes.

The seal coat is preferably applied in the form of an aqueous dispersion. Many vinyl resins suitable as an ingredient in the seal coat are commercially available in the form of an aqueous dispersion containing from 40 to 50 percent solids. The dispersion can contain, in addition to the plasticizer, resin, pigment and filler, conventional wetting agent, thickening agents, anti-foam agents, sequestering agents and alkali. Suitable wetting agents include the sodium salt of polymerized alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable antifoam agents are pine oil, silicone anti-foam agents such as Anti-foam A, manufactured by the Dow-Corning Company, Midland, Michigan, diglycol laurate, and octyl alcohol. Suitable sequestering agents include tetrasodium pyrophosphate and the tetrasodium salt of ethylenediamine tetra-acetic acid. The alkali provides a pH of above 7.0 so that there will be no tendency for the latex to coagulate. Calcium hydroxide, sodium hydroxide, ammonia, and potassium hydroxide are suitable alkalis for this purpose.

Normally, the pigments and fillers are ground with water in the presence of wetting agents, thickening agents and the like and the pigment dispersion is mixed with the vinyl resin and plasticizer later. Alternately, the seal coat can be effectively applied in the form of a solution using, for example, a solvent such as toluene or methyl ethyl ketone. However, the cost of using solvent and the fire and health hazards created by its use render the method undesirable.

The seal coat can contain stabilizers to retard the decomposition of the vinyl resin and increase the life of the product, such as sulfides and sulfites of aluminum, silver, calcium, cadmium, cerium, sodium, magnesium, strontium; lead and tin stearates; oleates and other complexes; glycerine, leucine, alanine, o- and p-aminobenzoic and sulfanilic acids, hexamethylene tetramine, salts including phosphates, stearates, palmitates, oleates, ricinoleates, abietates, laurates, salicylates; and the like.

The seal coats are characterized by comprising a vinyl resin, that is, a polymeric material obtained by polymerizing compounds containing at least one —CH=C radical. Useful vinyl resins include homopolymers, copolymers, and terpolymers and the like, such as polyvinyl chloride, polyvinyl acetate, polyvinyl propionate, polyvinyl butyrate, polymerized vinylidene chloride, polymerized acrylic acid and its lower alkyl esters such as those containing up to five carbon atoms as for example polymerized ethyl acrylate, polymerized methyl acrylate, polymerized propyl acrylate, polymerized butyl acrylate, polymerized methyl methacrylate, and the like; copolymers of the above with each other such as vinyl chloride-vinyl acetate copolymer, vinylidene chloride-vinyl chloride polymer, methyl methacrylate-vinyl chloride copolymer, methyl acrylate- ethyl acrylate copolymer, ethyl acrylate-butyl acrylate copolymer, and the like and copolymers and terpolymers of the above with other monomers copolymerizable therewith, such as vinyl esters including vinyl bromide, vinyl chloroacetate, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, chlorostyrene, coumarone, vinyl pyridine and the like; maleic and fumaric acid and their derivatives such as diethyl maleate, dibutyl maleate, dimethyl fumarate and the like; unsaturated hydocarbon such as ethylene, propylene, butylene and the like; allyl compounds such as alyl acetate, allyl chloride, allyl ethyl ether, and the like; conjugated and cross-conjugated unsaturated compounds such as butadiene, isoprene, chloroprene, 2,3-dimethylbutadiene-1,3, divinyl ketone and the like. The monomers listed hereinabove are useful in preparing polymers with a vinyl resin and can be used as modifiers in the polymerization, in which case they may be present in an amount of a few percent, or they can be used in larger quantities, up to as high as 40 percent by weight of the mixture to be polymerized. If desired, a mixture of vinyl resins can be used in preparing coating paints for use in the invention. If the resins are to be used in emulsions, it is desirable for the resins to be prepared by emulsion polymerization.

A plasticizer for the vinyl resin is also frequently present in the seal coat composition. Suitable plasticizers for the vinyl resin include ester type plasticizers such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, didecyl adipate and the like, rubbery plasticizers such as butadienestyrene copolymer, butadiene-acrylonitrile copolymer and the like, and other materials which function as plasticizers such as epoxidized drying oils, aromatic hydrocarbon condensates and the like. Where certain flexible soft vinyl resins are used in formulating the seal coat, such as polymers containing large proportions of ethyl acrylate, no plasticizer is needed. However, in most instances, a plasticizer is essential in order to impart the necessary properties of flexibility to the dried seal coat film.

Seal coat compositions useful in the invention are characterized by containing large proportions of solid filler. The term filler as used in the specification and the claims, embraces both coloring pigments such as titanium dioxide, zinc oxide, barium sulfate, calcium sulfate, magnesium carbonate, magnesium silicate and the like and inert filling materials such as silica, both amorphous and crystalline, whiting, talc, clay, pumice, limestone and the like. The dried seal coat film can contain up to 85 percent by weight of filler.

As described hereinabove, the seal coats should preferably have a total thickness of about 0.004 inch to about 0.012 inch in order to insure complete covering of all irregularities in the fibrous backing sheet and yield a smooth surface for printing. The use of two or more coats is particularly effective since the formulations for the individual coatings can be specially designed for the particular requirements of each coating. Thus, the coating applied directly to the fibrous sheet, where an asphalt impregnant is used, is designed to provide a high degree of seal against migration of asphalt. The upper coating, upon which the decorative design is printed, is designed to provide a film to which the vinyl printing inks and vinyl wearing surface layer will adhere. An intermediate seal coat can be used to provide a bridge between the first and uppermost coatings, thereby promoting optimum adhesion between the coatings and insuring a high degree of resistance to delamination in the finished product. In addition, where two or three seal coats are used, the desired total thickness can be obtained using the conventional techniques of coating such as flexible doctor roller application. Two or more thin coats are also preferred over one thick coat to insure level and smoothness of the coatings and to insure complete drying after their application.

In accordance with preferred embodiments of the invention, the first seal coat comprises a vinyl polymer of vinylidene chloride, vinyl chloride, vinyl ester of a carboxylic acid having from two to four carbon atoms or a lower alkyl acrylate with ethyl acrylate being particularly useful, including copolymers and terpolymers of the above. The first seal coat also preferably contains a plasticizer for the vinyl resin in the relative proportions of about 0.75 to 8 parts vinyl resin to 1 part plasticizer. A particularly effective range of proportions is 1.5 to 4 parts vinyl resin to 1 part plasticizer. The seal coat is highly filled, containing 20 to 85 percent of its weight of filler, with a range of 60 to 80 percent filler by weight of the dry first seal coat being particularly effective.

Polymers of vinylidene chloride, polyvinyl acetate and copolymers of ethyl acrylate with methyl acrylate containing more than 50 percent ethyl acrylate are preferred vinyl resins in the first seal coat where an asphalt impregnated backing is used, since these resins have excellent properties for sealing against migration of asphalt. Copolymers of vinylidene chloride and vinyl chloride containing 50 to 70 percent vinylidene chloride are particularly effective.

Any of the plasticizers listed hereinabove can be used; where an asphalt impregnated backing is used, the plasticizer should have incompatibility with asphalt. Butadiene-styrene copolymer, with or without the addition of small amounts of butadiene-acrylonitrile copolymer, is a particular effective plasticizer.

The second seal coat comprises a vinyl polymer of vinylidene chloride, vinyl chloride, vinyl ester of a carboxylic acid having from two to four carbon atoms or a lower alkyl acrylate with ethyl acrylate being particularly useful, including copolymers and terpolymers thereof. The second seal coat also preferably contains a plasticizer for the vinyl resin in the relative proportions of about 0.5 to 6 parts vinyl resin to 1 part plasticizer. A particularly effective range of proportions is 1 to 3 parts vinyl resin to 1 part plasticizer. The second seal coat is highly filled, containing 20 to 85 percent of its weight of filler, with a range of 60 to 80 percent filler by weight of the dry second seal coat being particularly effective.

Polymers of vinylidene chloride and copolymers of ethyl acrylate with methyl acrylate containing more than 50 percent ethyl acrylate are preferred vinyl resins in the second seal coat. Copolymers of vinylidene chloride and vinyl chloride containing 50 to 70 percent vinylidene chloride are particularly effective.

Any of the plasticizers listed hereinabove can be used. Butadiene-acrylonitrile copolymer and butadiene-styrene copolymer are particularly effective plasticizers in the second seal coat since coatings so formulated are characterized by excellent adhesion to the first seal coat.

The third seal coat comprises a vinyl polymer of vinylidene chloride, vinyl chloride, vinyl ester of a carboxylic acid containing two to four carbon atoms, or a lower alkyl acrylate with ethyl acrylate being particularly effective, including copolymers and terpolymers thereof. The third seal coat also preferably contains a plasticizer for the vinyl resin in the relative proportions of 0.25 to 3 parts vinyl resin to 1 part plasticizer. A particularly effective range of proportions is 0.5 to 1.5 parts vinyl resin to 1 part plasticizer. The third seal coat contains filler up to 80 percent of its weight with a range of 50 to 75 percent by weight of dry third seal coat being particularly effective.

Polymers of vinyl chloride and copolymers of ethyl acrylate containing over 70 percent ethyl acrylate are particularly effective vinyl resins in the third seal coat. Any of the plasticizers listed hereinabove can be used with butadiene-styrene and butadiene-acrylonitrile copolymers being particularly effective.

It is normally desirable that the third seal coat contains a smaller proportion of filler than is present in the first and second seal coats to insure the formation of a smooth film for a printing surface. As indicated above, one thick coat can be used to replace two thinner coats.

The seal coats must be formulated to insure satisfactory adhesion one to another and the upper seal coat must provide a compatible base for adhesion of a vinyl chloride polymer wearing surface layer thereto. Adhesion is promoted by having common resins and/or plasticizers in adjacent coats. For example, in a particularly effective embodiment of the invention, the first seal coat comprises vinylidene-chloride-vinyl chloride copolymer and butadiene-styrene copolymer, the second seal coat comprises vinylidene chloride-vinyl chloride copolymer and butadiene-acrylonitrile copolymer, and the third seal coat comprises polyvinyl chloride and butadiene-acrylonitrile copolymer. Thus, the first and second seal coats share a common vinyl resin and the second and third seal coats share a common plasticizer. The polyvinyl chloride in the third seal coat is compatible with vinyl chloride printing inks and a vinyl chloride wearing surface layer.

A decorative design is applied to the seal coated surface of the sheet after the third seal coat has dried. This step is conventional and paints and inks normally used for application of a decorative design to a vinyl film or layer are used. The composition is preferably formulated so that the binder of the ink contains an appreciable quantity of a vinyl resin. Suitable vinyl resins include vinyl chloride polymer, vinyl chloride-vinyl acetate copolymer, vinyl chloride-vinyl propionate copolymer, vinyl butyrate polymer, vinylidene chloride polymer, vinylidene chloride-vinyl chloride copolymer, copolymers of vinyl chloride and vinylidene chloride with esters of maleic and fumaric acid, such as dimethyl, diethyl, and dibutyl maleate and fumarate, and the like. Extender resins, such as nitrocellulose, can be employed as a portion of the binder for the ink or paint.

Any of the plasticizers normally present in vinyl printing inks and paints can be used, such as tricresyl phosphate, dioctyl phthalate, polypropylene glycol sebacate, tributyl phosphate, phenyl phosphate, dioctyl sebacate, dibutyl sebacate and the like. The decorative coat contains pigments according to the colors desired and is preferably formulated as a solution in a solvent such as cyclohexanone, methyl ethyl ketone, methyl isobutyl ketone and the like. Stabilizers as described in connection with the seal coat can be used.

The decorative coat can be applied to the seal coated surface of the sheet in any way appropriate for producing the particular decoration desired. Any of the rotary graphic art printing processes such as rotogravure, offset printing, or lithography can be used. If desired, the design can be applied by conventional block printing technique.

Improved adhesion and clarity of the design and a reduction in the amount of decorative ink or paint required can be brought about by application of a thin size coat to the third seal coat. The decorative design is then printed on the dry size coat. The size coat comprises a vinyl resin and a plasticizer and is applied preferably as a solution in a solvent. A typical size coat application is 0.02 pound per square yard of surface.

A clear wear-resisting layer is applied to the dry decorative coat. The wear layer usually comprises a mixture of vinyl resin and a plasticizer in the proportions of about 20 to 60 parts plasticizer per 100 parts vinyl resin. A range of 30 to 40 parts plasticizer per 100 parts vinyl resin is particularly effective.

Vinyl resins, such as described in connection with the seal coats are satisfactory, with polymers, including copolymers and terpolymers, of vinyl chloride being particularly effective. Suitable plasticizers, such as those disclosed in connection with the seal coat are normally used. Stabilizers can also be used.

The wear layer is preferably applied as an organosol, plastisol, or hydrosol, the coating is dried, and then fused as by exposure to infrared radiation. A temperature of about 350° F.–375° F. is normally required for fusion, although higher or lower temperatures can be used depending on the molecular weight of the vinyl resin. When a comparatively thick design is applied, as by block printing technique, a paint comprising a vinyl resin, a plasticizer, and suitable pigments and fillers can be applied as an organosol, plastisol or hydrosol followed by drying and fusing. In this case, the decorative layer also functions as a wear-resisting layer.

While it is normally preferable that the wear layer be of the fused type, it can be applied as a solution where the plasticized vinyl resin is dissolved in a suitable solvent. Moreover, a preformed film or sheet of vinyl composition can be laminated to the decorative coating using a suitable vinyl-based adhesive or heat.

The following are typical examples of first seal coat compositions:

*Example 1*

| | Parts |
|---|---|
| Vinylidene chloride-vinyl chloride copolymer latex (50 percent solids) (1) | 45 |
| Butadiene-acrylonitrile copolymer latex (50 percent solids) (6) | 25 |
| Whiting | 247 |
| Sodium alkyl aryl sulfonate | 0.6 |
| Sodium alkyl sulfate solution (5 percent solids) | 6 |
| Water | 75 |

*Example 2*

| | |
|---|---|
| Vinylidene chloride-vinyl chloride copolymer latex (50 percent solids) (1) | 28 |
| Butadiene-styrene copolymer latex (45 percent solids) (2) | 11 |
| Whiting | 75 |
| Titanium dioxide | 5 |
| Sodium alkyl sulfate solution (5 percent solids) | 80 |
| Methyl cellulose dispersion (3.5 percent solids) | 12 |
| Sodium hydroxide solution (25 percent solids) | 1 |
| Water | 9 |

*Example 3*

| | |
|---|---|
| Vinylidene chloride-vinyl chloride copolymer latex (50 percent solids) (1) | 40 |
| Butadiene-acrylonitrile copolymer latex (50 percent solids) (6) | 20 |
| Whiting | 70 |
| Titanium dioxide | 5 |
| Sodium alkyl aryl sulfonate | 2 |
| Methyl cellulose dispersion (7 percent solids) | 16 |
| Water | 25 |

*Example 4*

| | |
|---|---|
| Vinylidene chloride-vinyl chloride copolymer latex (50 percent solids) (1) | 140 |
| Butadiene-styrene copolymer latex (50 percent solids) (3) | 50 |
| Calcium carbonate | 375 |
| Lecithin | 2 |
| Tetrasodium pyrosphate solution (6 percent solids) | 24 |
| Casein solution (15 percent solids) | 13 |

*Example 5*

| | |
|---|---|
| Vinylidene chloride-vinyl chloride copolymer latex (50 percent solids) (1) | 131 |
| Butadiene-styrene copolymer latex (50 percent solids) (3) | 46 |

*Example 5—Continued*

| | Parts |
|---|---|
| Butadiene-acrylonitrile copolymer latex (50 percent solids) (6) | 13 |
| Calcium carbonate | 375 |
| Lecithin | 2 |
| Tetrasodium pyrophosphate solution (6 percent solids) | 24 |
| Casein solution (15 percent solids) | 13 |

*Example 6*

| | |
|---|---|
| Ethyl acrylate-methyl acrylate copolymer latex (46 percent solids) (7) | 190 |
| Calcium carbonate | 345 |
| Lecithin | 2 |
| Tetrasodium pyrophosphate solution (6 percent solids) | 22 |
| Casein solution (15 percent solids) | 12 |

*Example 7*

| | |
|---|---|
| Ethyl acrylate-methyl acrylate copolymer latex (46 percent solids) (7) | 140 |
| Butadiene-styrene copolymer latex (50 percent solids) (3) | 46 |
| Calcium carbonate | 345 |
| Lecithin | 2 |
| Tetrasodium pyrophosphate solution (6 percent solids) | 22 |
| Casein solution (15 percent solids) | 12 |

*Example 8*

| | |
|---|---|
| Ethyl acrylate-methyl acrylate copolymer latex (46 percent solids) (8) | 190 |
| Calcium carbonate | 345 |
| Lecithin | 2 |
| Tetrasodium pyrophosphate solution (6 percent solids) | 22 |
| Casein solution (15 percent solids) | 12 |

*Example 9*

| | |
|---|---|
| Vinylidene chloride polymer latex (50 percent solids) | 28 |
| Butadiene-styrene copolymer latex (45 percent solids) (2) | 11 |
| Whiting | 75 |
| Titanium dioxide | 5 |
| Sodium alkyl sulfate solution (5 percent solids) | 80 |
| Methyl cellulose dispersion (3.5 percent solids) | 12 |
| Sodium hydroxide solution (25 percent solids) | 1 |
| Water | 9 |

*Example 10*

| | |
|---|---|
| A mixture of vinyl chloride and methyl methacrylate (latex, 50 percent solids) | 120 |
| Butadiene-styrene copolymer latex (50 percent solids) (3) | 56 |
| Whiting | 104 |
| Titanium dioxide | 5 |
| Sodium alkyl sulfate solution (5 percent solids) | 90 |
| Methyl cellulose dispersion (3.5 percent solids) | 15 |
| Sodium hydroxide solution (25 percent solids) | 1 |
| Water | 11 |

*Example 11*

| | |
|---|---|
| Polyvinyl acetate latex (57 percent solids) (5) | 188 |
| High molecular weight polyester plasticizer (9) | 14 |
| Tetrasodium pyrophosphate | 1 |
| Casein solution (10 percent solids) | 36 |
| Clay | 26 |
| Red oxide | 12 |
| Calcium carbonate | 308 |
| Water | 56 |

The following are examples of typical second seal coat formulation:

Example 12

| | Parts |
|---|---|
| Vinylidene chloride-vinyl chloride copolymer latex (50 percent solids)(1) | 40 |
| Butadiene-acrylonitrile copolymer latex (50 percent solids)(6) | 20 |
| Whiting | 72 |
| Sodium alkyl sulfate solution (10 percent solids) | 2 |
| Ammonia solution (5 percent solids) | 2 |
| Methyl cellulose suspension (7 percent solids) | 40 |
| Water | 76 |

Example 13

| | |
|---|---|
| Vinylidene chloride-vinyl chloride copolymer latex (50 percent solids)(1) | 30 |
| Butadiene-styrene copolymer latex (45 percent solids)(2) | 22 |
| Whiting | 82 |
| Sodium alkyl sulfate solution (10 percent solids) | 2 |
| Ammonia solution (5 percent solids) | 2 |
| Methyl cellulose suspension (7 percent solids) | 40 |
| Water | 83 |

Example 14

| | |
|---|---|
| Vinylidene chloride polymer latex (50 percent solids) | 28 |
| Butadiene-acrylonitrile copolymer latex (50 percent solids)(6) | 17 |
| Whiting | 63 |
| Titanium dioxide | 3 |
| Sodium alkyl sulfate | 0.2 |
| Methyl cellulose dispersion (3½ percent solids) | 10 |
| Sodium hydroxide | 0.2 |
| Water | 19 |

Example 15

| | |
|---|---|
| Vinyl chloride-methyl methacrylate copolymer latex (50 percent solids) | 60 |
| Butadiene-acrylonitrile copolymer latex (50 percent solids)(6) | 40 |
| Whiting | 48 |
| Titanium dioxide | 3 |
| Sodium alkyl sulfate | 0.2 |
| Methyl cellulose dispersion (3½ percent solids) | .8 |
| Sodium hydroxide | 0.2 |
| Water | 14 |

Example 16

| | |
|---|---|
| Vinyl chloride-vinyl acetate copolymer latex (50 percent solids) | 28 |
| Dioctyl phthalate | 8 |
| Magnesium carbonate | 68 |
| Sodium alkyl aryl sulfonate | 1.5 |
| Casein suspension (25 percent solids) | 8 |
| Water | 39 |

Example 17

| | |
|---|---|
| Vinylidene chloride-vinyl chloride copolymer latex (50 percent solids) (1) | 1000 |
| Butadiene-acrylonitrile copolymer latex (50 percent solids) (6) | 575 |
| Calcium carbonate | 2050 |
| Tetrasodium pyrophosphate dispersion (6 percent solids) | 157 |
| Titanium dioxide dispersion (50 percent solids) | 208 |
| Casein dispersion (15 percent solids) | 542 |
| Water | 158 |

Example 18

| | |
|---|---|
| Ethyl acrylate-methyl methacrylate copolymer latex (46 percent solids) (7) | 745 |
| Butadiene-acrylonitrile copolymer latex (50 percent solids) (6) | 394 |

Example 18—Continued

| | Parts |
|---|---|
| Calcium carbonate | 1400 |
| Tetrasodium pyrophosphate dispersion (6 percent solids) | 107 |
| Titanium dioxide dispersion (50 percent solids) | 142 |
| Casein dispersion (15 percent solids) | 371 |
| Water | 78 |

Example 19

| | |
|---|---|
| Ethyl acrylate-methyl methacrylate copolymer latex (46 percent solids) (7) | 1170 |
| Calcium carbonate | 1400 |
| Tetrasodium pyrophosphate dispersion (6 percent solids) | 107 |
| Titanium dioxide dispersion (50 percent solids) | 142 |
| Casein dispersion (15 percent solids) | 371 |
| Water | 62 |

Example 20

| | |
|---|---|
| Ethyl acrylate-methyl acrylate copolymer latex (8) | 1170 |
| Calcium carbonate | 1400 |
| Tetrasodium pyrophosphate dispersion (6 percent solids) | 107 |
| Titanium dioxide dispersion (50 percent solids) | 142 |
| Casein dispersion (15 percent solids) | 371 |
| Water | 62 |

The following are examples of typical third seal coat formulations:

Example 21

| | Parts |
|---|---|
| Vinyl chloride polymer latex (50 percent solids) (4) | 30 |
| Butadiene-acrylonitrile copolymer latex (50 percent solids) (6) | 30 |
| Sodium alkyl aryl sulfonate | 2 |
| Titanium dioxide | 14 |
| Whiting | 54 |
| Methyl cellulose suspension (7 percent solids) | 15 |
| Water | 20 |

Example 22

| | |
|---|---|
| Vinyl chloride polymer latex (50 percent solids) (4) | 42 |
| Butadiene-acrylonitrile copolymer latex (50 percent solids) (6) | 44 |
| Dioctyl phthalate | 7 |
| Sodium alkyl aryl sulfonate (5 percent dispersion) | 4 |
| Sodium hydroxide solution (25 percent solids) | 0.4 |
| Titanium dioxide | 25 |
| Whiting | 100 |
| Methyl cellulose dispersion (3.5 percent solids) | 20 |
| Water | 62 |

Example 23

| | |
|---|---|
| Vinyl chloride-vinyl acetate copolymer latex (50 percent solids) | 400 |
| Butadiene-styrene copolymer latex (45 percent solids) (2) | 350 |
| Titanium dioxide | 120 |
| Limestone | 500 |
| Tetrasodium pyrophosphate | 2.5 |
| Resin acid soap | 4 |
| Carboxymethyl cellulose | 4 |
| Water | 350 |

Example 24

| | |
|---|---|
| Vinyl chloride-vinyl acetate copolymer latex (50 percent solids) | 400 |
| Butadiene-acrylonitrile copolymer latex (50 percent solids) (6) | 315 |
| Titanium dioxide | 120 |
| Limestone | 500 |
| Tetrasodium pyrophosphate | 2.5 |
| Resin acid soap | 4 |
| Carboxymethyl cellulose | 4 |
| Water | 385 |

Example 25

| | Parts |
|---|---|
| Vinyl chloride polymer latex (50 percent solids) (4) | 990 |
| Butadiene-acrylonitrile copolymer latex (50 percent solids) (6) | 970 |
| Calcium carbonate | 1300 |
| Titanium dioxide | 800 |
| Tetrasodium pyrophosphate solution (6 percent solids) | 122 |
| Casein solution (15 percent solids) | 262 |
| Water | 500 |

Example 26

| | Parts |
|---|---|
| Ethyl acrylate-methyl acrylate copolymer latex (57 percent solids) (8) | 1720 |
| Calcium carbonate | 1300 |
| Titanium dioxide | 800 |
| Tetrasodium pyrophosphate solution (6 percent solids) | 122 |
| Casein solution (15 percent solids) | 262 |
| Water | 740 |

Heat stabilizers, light stabilizers, coloring pigments and anti-foam agents can also be present in the formulations shown as Examples 1 to 26, if desired. The reference numbers in the foregoing examples refer to the following materials:

(1) 50 percent vinylidene chloride-50 percent vinyl chloride copolymer latex sold under the trade name X–814 by Dow Chemical Co., Midland, Michigan.
(2) 40 percent butadiene-60 percent styrene copolymer latex sold under the trade name 513–K by Dow Chemical Co., Midland, Michigan.
(3) 40 percent butadiene-60 percent styrene copolymer latex sold under the trade name X–2575 by Dow Chemical Co., Midland, Michigan.
(4) 90 percent vinyl chloride-10 percent dibutyl maleate copolymer latex sold under the trade name Pliovic 300 by Goodyear Tire and Rubber Co., Akron, Ohio.
(5) Polyvinyl acetate latex sold under the trade name Elvacet 81–900 by E. I. du Pont de Nemours & Co., Wilmington, Delaware.
(6) 67 percent butadiene-33 percent acrylonitrile copolymer latex sold under the trade name Chemigum C3–1021 by Goodyear Tire and Rubber Co., Akron, Ohio.
(7) Majority ethyl acrylate-minority methyl acrylate copolymer latex sold under the trade name B–60A by Rohm and Haas Co., Philadelphia, Pennsylvania.
(8) Predominantly ethyl acrylate-minor portion methyl acrylate copolymer latex sold under the trade name B–15A by Rohm and Haas Co., Philadelphia, Pennsylvania.
(9) High molecular weight polyester plasticizer sold under the trade name Hercoflex 900 by Hercules Powder Company, Wilmington, Delaware.

A typical size coat composition is as follows:

Example 27

| | Percent |
|---|---|
| Polyvinyl chloride | 12.1 |
| Tricresyl phosphate | 6.5 |
| Methyl ethyl ketone | 81.4 |
| | 100.0 |

Typical printing compositions for use in the invention are as follows:

Example 28

| | Percent |
|---|---|
| Polyvinyl chloride | 8.3 |
| Pigments | 18.0 |
| Polypropylene glycol sebacate | 14.5 |
| Methyl ethyl ketone | 44.3 |
| Cyclohexanone | 14.9 |
| | 100.0 |

Example 29

| | Percent |
|---|---|
| Vinyl chloride-vinyl acetate copolymer | 12.2 |
| Pigments | 11.1 |
| Tricresyl phosphate | 15.7 |
| Methyl ethyl ketone | 61.0 |
| | 100.0 |

Typical wear layer formulations for use in the invention are as follows:

Example 30

| | Parts |
|---|---|
| Vinyl chloride-vinyl acetate copolymer | 50 |
| Tricresyl phosphate | 15 |
| Xylene | 40 |

Example 31

| | |
|---|---|
| Vinyl chloride polymer | 50 |
| Dioctyl phthalate | 17 |
| Toluene | 30 |

Example 32

| | |
|---|---|
| Vinyl chloride polymer | 80 |
| Dioctyl phthalate | 13 |
| Tricresyl phosphate | 7 |
| Polyester plasticizer | 7 |
| Stabilizers | 4 |
| Mineral spirits | 17 |
| Methyl ethyl ketone | 2 |

The following examples show typical methods for the utilization of the formulations of the foregoing examples in the preparation of printed surface coverings:

Example 33

A sheet of felted cellulose fibers made up of rags, wood fibers and paper was uniformly impregnated throughout with an asphalt having a melting point of 145° F. in an amount constituting 110 percent by weight of the dry fibers. This amount represents 50 percent of the kerosene value of the felt.

A first seal coat formulated according to Example 1 was doctored onto a surface of the impregnated felt and the felt was dried at a temperature of 115° F. for 100 minutes. The dried first seal coat weighed 0.4 pound per square yard of felt. A second seal coat formulated according to Example 12 was doctored onto the dried first seal coat and the felt again was dried at a temperature of 115° F. for 100 minutes. The dried second seal coat film weighed 0.2 pound per square yard of felt. A third seal coat formulated according to Example 21 was doctored onto the dry second seal coat and the felt again was dried at a temperature of 115° F. for 100 minutes. The dried third seal coat film weighed 0.2 pound per square yard of felt. The total thickness of the three seal coats was 0.007 inch.

A light application of a size coat formulated according to Example 27 was applied to the dried third seal coat followed by application of a decorative design by means of a multi-cylinder rotogravure printing press using a printing ink formulated according to Example 28. Between cylinders and after the last cylinder, the sheet was subjected to heat to remove solvent from the printing ink formulation. To the dried decorative design, an organosol formulated as shown in Example 30 was applied. The sheet was then passed through a forced hot air oven in which the organosol layer attained a temperature of 350° F., thereby removing solvent in the organosol and solvating the polyvinyl chloride resin by the plasticizers in the fusion process. The resulting product was cooled, inspected and packaged for sale.

The printed surface covering produced was characterized by a high degree of clarity and fidelity of the design, a complete absence of any yellow discoloration or blistering and a smooth wearing surface layer. All the layers making up the product were integrally bonded one to another with the result that the product exhibited a high degree of resistance to delamination. The fused, tough polyvinyl chloride wearing surface layer imparted excellent abrasion resistance to the product.

Additional samples of printed surface coverings were produced in the same manner as described hereinabove in Example 33 with the exception that different coating compositions were used as indicated in the following tabulation. In the following tabulation, numbers listed under each of the vertical columns refer to the example numbers describing the particular formulations used:

| Example | First Seal Coat | Second Seal Coat | Third Seal Coat | Size Coat | Printing Ink | Wear Layer |
|---|---|---|---|---|---|---|
| 34 | 5 | 17 | 25 | 27 | 28 | 32 |
| 35 | 9 | 17 | 25 | 27 | 28 | 32 |
| 36 | 11 | 17 | 25 | 27 | 28 | 32 |
| 37 | 7 | 17 | 25 | 27 | 28 | 32 |
| 38 | 8 | 17 | 25 | 27 | 28 | 32 |
| 39 | 9 | 14 | 25 | 27 | 28 | 32 |
| 40 | 2 | 15 | 25 | 27 | 28 | 32 |
| 41 | 8 | 20 | 26 | 27 | 28 | 32 |
| 42 | 6 | 18 | 25 | 27 | 28 | 32 |

The printed surface coverings produced in accordance with each of the Examples 34 to 42 exhibited the same properties as those exhibited by the printed surface covering of Example 33, that is absence of blistering and yellow discoloration, clarity and fidelity of design, smooth wearing surface layer, high degree of resistance to delamination and high degree of resistance to abrasion.

*Example 43*

A sheet of felted cellulose fibers was impregnated with 10 percent of its weight of polyvinyl acetate and 45 percent of its weight of a light colored petroleum resin having a softening point of 115° F. Utilizing this impregnated felt as a backing, the seal coats, size coat, printing ink and wear layer as described in Example 33 were applied in the manner indicated in Example 33. After fusion, the resulting printed surface covering exhibited the same properties as the printed surface covering produced in accordance with Examples 33 to 42.

The invention has been described with reference to production of a decorative surface covering having a thin decorative design layer protected by a clear fused layer of wear resisting vinyl resinous composition. It is apparent that where printing techniques are used which are capable of applying a thick layer of decorative design, such as flat bed printing, a separate wear resisting composition layer is not needed. In this technique, the decorative composition is a fusible vinyl resinous composition which after application to the seal coated felt is subjected to heat to effect fusion. The resulting product is characterized by high degree of resistance to delamination.

Any departure from the foregoing description which conforms to the present invention is intended to be included within the scope of the claims.

What is claimed is:

1. A decorative printed surface covering for floors, walls and the like characterized by having a smooth surface and exhibiting excellent resistance to delamination which comprises an impregnated felted fibrous backing, at least one underseal coat formed on a surface of said backing comprising a vinyl resin selected from the group consisting of polymers of vinylidene chloride, lower alkyl acrylates and vinyl esters of a carboxylic acid having from two to four carbon atoms, and about 20 to about 85 per cent filler, a top seal coat formed on the surface of the underseal coats comprising a vinyl resin selected from the group consisting of polymers of vinyl chloride and lower alkyl acrylates, and about 20 to about 80 per cent filler, the total thickness of said seal coats being at least 0.004 inch and a top coat of a fused polymer of vinyl chloride.

2. The decorative printed surface covering of claim 1 wherein said underseal coat comprises a polymer of vinylidene chloride.

3. The decorative printed surface covering of claim 1 wherein said underseal coat comprises a polymer of a lower alkyl acrylate.

4. The decorative printed surface covering of claim 1 wherein said underseal coat comprises a polymer of vinyl acetate.

5. The decorative printed surface covering of claim 1 wherein said underseal coat comprises a polymer of ethyl acrylate.

6. The decorative printed surface covering of claim 1 wherein said top seal coat comprises a polymer of vinyl chloride.

7. A decorative printed surface covering for floors, walls and the like characterized by having a smooth surface and exhibiting excellent resistance to delamination which comprises an impregnated felted fibrous backing, a first seal coat formed on a surface of said backing comprising a vinyl resin selected from the group consisting of polymers of vinylidene chloride, lower alkyl acrylates and vinyl esters of a carboxylic acid having from two to four carbon atoms, and about 20 to about 85 per cent filler, a second seal coat formed on the surface of said first seal coat comprising a vinyl resin selected from the group consisting of polymers of vinylidene chloride, lower alkyl acrylates and vinyl esters of a carboxylic acid having from two to four carbon atoms, and about 20 to about 85 percent filler, a third seal coat formed on the surface of said second seal coat comprising a vinyl resin selected from the group consisting of polymers of vinyl chloride and lower alkyl acrylates, and about 20 to about 80 percent filler, the total thickness of said seal coats being at least 0.004 inch and a top coat of a fused polymer of vinyl chloride.

8. The decorative printed surface covering of claim 7 wherein said first seal coat contains a copolymer of butadiene and styrene as a plasticizer.

9. The decorative printed surface covering of claim 7 wherein said second seal coat contains a plasticizer selected from the group consisting of copolymers of butadiene and styrene and copolymers of butadiene and acrylonitrile.

10. The decorative printed surface covering of claim 7 wherein said third seal coat contains a plasticizer selected from the group consisting of copolymers of butadiene and styrene and copolymers of butadiene and acrylonitrile.

11. The decorative printed surface covering of claim 7 wherein said first seal coat comprises a copolymer of vinylidene chloride and vinyl chloride, a copolymer of butadiene and styrene and about 20 to about 85 percent filler.

12. The decorative printed surface covering of claim 7 wherein said first seal coat comprises a copolymer of ethyl acrylate and methyl acrylate and about 20 to about 85 percent filler.

13. The decorative printed surface covering of claim 7 wherein said first seal coat comprises a copolymer of ethyl acrylate and methyl acrylate, a copolymer of butadiene and styrene and about 20 to about 85 percent filler.

14. The decorative printed surface covering of claim 7 wherein said first seal coat comprises a polymer of vinylidene chloride, a copolymer of butadiene and styrene and about 20 to about 85 percent filler.

15. The decorative printed surface covering of claim 7 wherein said first seal coat comprises a mixture of polymers of vinyl chloride and methyl methacrylate, a copolymer of butadiene and styrene and about 20 to about 85 percent filler.

16. The decorative printed surface covering of claim 7 wherein said first seal coat comprises a polymer of vinyl acetate and about 20 to about 85 percent filler.

17. The decorative printed surface covering of claim 7 wherein said second seal coat comprises a copolymer of vinylidene chloride and vinyl chloride, a copolymer of butadiene and acrylonitrile and about 20 to about 85 percent filler.

18. The decorative printed surface covering of claim 7 wherein said second seal coat comprises a copolymer of vinylidene chloride and vinyl chloride, a copolymer of butadiene and styrene and about 20 to about 85 percent filler.

19. The decorative printed surface covering of claim 7 wherein said second seal coat comprises a polymer of vinylidene chloride, a copolymer of butadiene and acrylonitrile and about 20 to about 85 percent filler.

20. The decorative printed surface covering of claim 7 wherein said second seal coat comprises a copolymer of vinyl chloride and methyl methacrylate, a copolymer of butadiene and acrylonitrile and about 20 to about 85 percent filler.

21. The decorative printed surface covering of claim 7 wherein said second seal coat comprises a copolymer of vinyl chloride and vinyl acetate and about 20 to about 85 percent filler.

22. The decorative printed surface covering of claim 7 wherein said second seal coat comprises a copolymer of ethyl acrylate and methyl methacrylate, a copolymer of butadiene and acrylonitrile and about 20 to about 85 percent filler.

23. The decorative printed surface covering of claim 7 wherein said second seal coat comprises a copolymer of ethyl acrylate and methyl acrylate and about 20 to about 85 percent filler.

24. The decorative printed surface covering of claim 7 wherein said third seal coat comprises a polymer of vinyl chloride, a copolymer of butadiene and acrylonitrile and about 20 to about 80 percent filler.

25. The decorative printed surface covering of claim 7 wherein said third seal coat comprises a copolymer of vinyl chloride and vinyl acetate, a copolymer of butadiene and styrene and about 20 to about 80 percent filler.

26. The decorative printed surface covering of claim 7 wherein said third seal coat comprises a copolymer of vinyl chloride and vinyl acetate, a copolymer of butadiene and acrylonitrile and about 20 to about 80 percent filler.

27. The decorative printed surface covering of claim 7 wherein said third seal coat comprises a copolymer of ethyl acrylate and methyl acrylate and about 20 to about 80 percent filler.

28. The decorative printed surface covering of claim 7 wherein said first seal coat comprises a polymer of vinylidene chloride.

29. The decorative printed surface covering of claim 7 wherein said first seal coat comprises a polymer of a lower alkyl acrylate.

30. The decorative printed surface covering of claim 7 wherein said second seal coat comprises a polymer of vinylidene chloride.

31. The decorative printed surface covering of claim 7 wherein said second seal coat comprises a polymer of a lower alkyl acrylate.

32. The decorative printed surface covering of claim 7 wherein said third seal coat comprises a polymer of vinyl chloride.

33. The decorative printed surface covering of claim 7 wherein said third seal coat comprises a polymer of a lower alkyl acrylate.

34. The decorative printed surface covering of claim 7 wherein said first seal coat is a polymer of vinylidene chloride, said second seal coat is a polymer of vinylidene chloride and said third seal coat is a polymer of vinyl chloride.

35. The decorative printed surface covering of claim 7 wherein said first seal coat is a polymer of vinyl acetate, said second seal coat is a polymer of vinylidene chloride and said third seal coat is a polymer of vinyl chloride.

36. The decorative printed surface covering of claim 7 wherein said first seal coat is a polymer of ethyl acrylate, said second seal coat is a polymer of vinylidene chloride and said third seal coat is a polymer of vinyl chloride.

37. The decorative printed surface covering of claim 7 wherein said first seal coat is a polymer of vinylidene chloride, said second seal coat is a polymer of vinyl chloride and said third seal coat is a polymer of vinyl chloride.

38. The decorative printed surface covering of claim 7 wherein said first seal coat is a polymer of ethyl acrylate, said second seal coat is a polymer of ethyl acrylate and said third seal coat is a polymer of ethyl acrylate.

39. The decorative printed surface covering of claim 7 wherein said first seal coat is a polymer of ethyl acrylate, said second seal coat is a polymer of ethyl acrylate and said third seal coat is a polymer of vinyl chloride.

40. The decorative printed surface covering of claim 7 wherein the total thickness of said seal coats is between about 0.004 to about 0.012 inch.

References Cited in the file of this patent

UNITED STATES PATENTS

| | | |
|---|---|---|
| 2,560,420 | Dodge | July 10, 1951 |
| 2,624,682 | Hazeltine | Jan. 6, 1953 |
| 2,624,683 | Bezman | Jan. 6, 1953 |
| 2,696,447 | Bezman | Dec. 7, 1954 |
| 2,705,683 | Hazeltine et al. | Apr. 5, 1955 |
| 2,705,684 | Hazeltine | Apr. 5, 1955 |
| 2,707,157 | Stanton et al. | Apr. 26, 1955 |
| 2,742,377 | Bezman | Apr. 17, 1956 |
| 2,748,042 | Borgese | May 29, 1956 |
| 2,769,726 | Wetterau et al. | Nov. 6, 1956 |
| 2,771,824 | Patch et al. | Nov. 27, 1956 |
| 2,774,685 | Carnegie | Dec. 18, 1956 |
| 2,784,113 | Hazeltine | Mar. 5, 1957 |
| 2,803,573 | Hassel | Aug. 20, 1957 |
| 2,809,125 | Hazeltine | Oct. 8, 1957 |
| 2,860,071 | Cohen | Nov. 11, 1958 |